United States Patent
Moraw

[11] 4,126,373
[45] Nov. 21, 1978

[54] HOLOGRAPHIC IDENTIFICATION ELEMENTS AND METHOD AND APPARATUS FOR MANUFACTURE THEREOF

[75] Inventor: Roland Moraw, Naurod, Fed. Rep. of Germany

[73] Assignee: Hoechst Aktiengesellschaft, Frankfurt am Main, Fed. Rep. of Germany

[21] Appl. No.: 753,469

[22] Filed: Dec. 22, 1976

[30] Foreign Application Priority Data

Dec. 22, 1975 [DE] Fed. Rep. of Germany ....... 2558056
Oct. 20, 1976 [DE] Fed. Rep. of Germany ....... 2647325

[51] Int. Cl.² .................. G02B 27/00; G09F 3/02
[52] U.S. Cl. .................. 350/3.61; 40/2.2; 283/7; 350/3.6
[58] Field of Search ............ 350/3.5; 40/2.2; 283/6, 283/7

[56] References Cited
U.S. PATENT DOCUMENTS

| | | | |
|---|---|---|---|
| 3,620,590 | 11/1971 | Barker | 350/3.5 |
| 3,643,216 | 2/1972 | Greenaway et al. | 350/3.5 X |
| 3,711,177 | 1/1973 | Ward | 350/3.5 X |
| 3,850,633 | 11/1974 | Moraw et al. | 350/3.5 X |
| 4,014,602 | 3/1977 | Ruell | 350/3.5 |

FOREIGN PATENT DOCUMENTS 2,163,943  9/1975  Fed. Rep. of Germany.
2,308,876  9/1973  Fed. Rep. of Germany.

*Primary Examiner*—John K. Corbin
*Assistant Examiner*—John D. Lee
*Attorney, Agent, or Firm*—Bacon & Thomas

[57] ABSTRACT

An identification element having an integral holographic recording as part thereof and method and apparatus for manufacture. The identification element is formed using an interference pattern from an object and reference laser beam wherein information on the identification element forms the object to be recorded on light sensitive material which is firmly and durably combined with the identification element.

18 Claims, 11 Drawing Figures

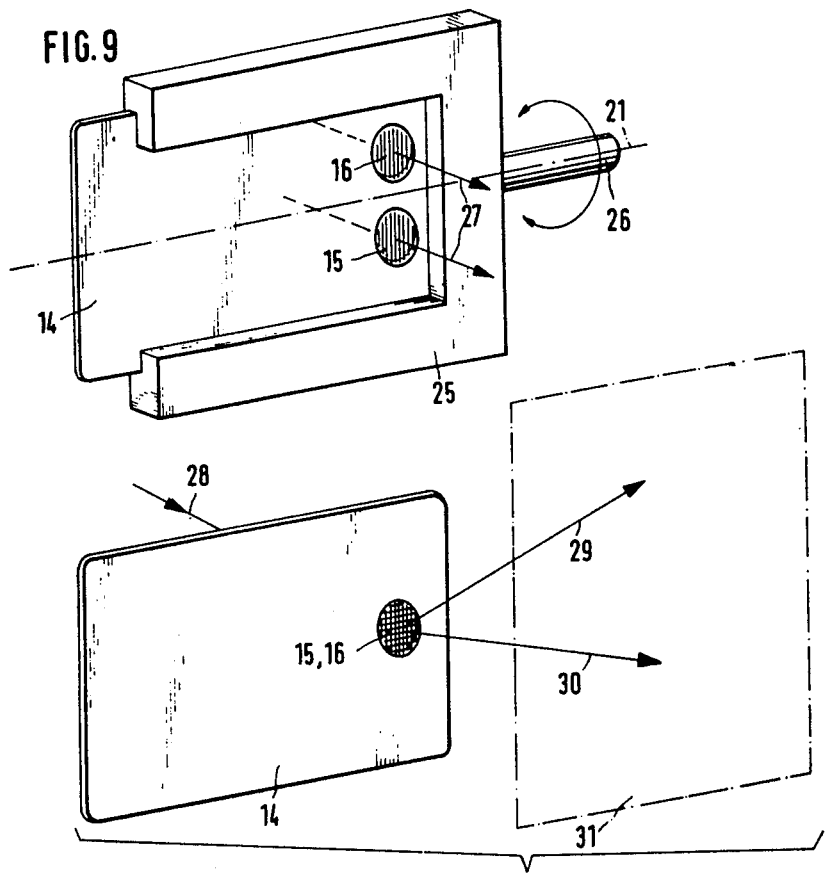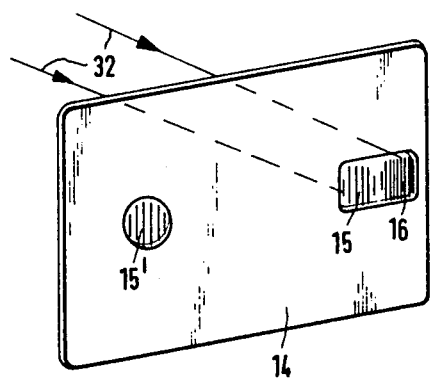

HOLOGRAPHIC IDENTIFICATION ELEMENTS AND METHOD AND APPARATUS FOR MANUFACTURE THEREOF

BACKGROUND OF THE INVENTION

1. Field of the Invention

The present invention relates to a process for the manufacture of identification elements by recording a hologram of an object carrying information on a light-sensitive recording material with the aid of an object beam and a reference beam; further, the present invention relates to an apparatus for performing the process.

The invention is used for the production of identity documents, such as identity cards, check cards, credit cards, customer's cards and other identification elements which serve to identify their bearer.

2. Description of the Prior Art

According to a known system, a hologram is disposed in or on an identification element, such as an identity or other card. The hologram contains, in code form, information which can be read only under special optical conditions. This information is recorded by forming a hologram on a suitable recording material, using, as the object, the card with printing and personal data thereon. The hologram is made separately and only then combined with the card, for example by inserting the recording material carrying the hologram in an aperture in the card. Alternatively, the recording material carrying the hologram may be attached to the back of the card.

This means that the hologram is produced on the recording material by means of laser light, only after the individual data were written on the card and while the recording material is separated from the card. Then the card and the hologram belonging to it are affixed, i.e. the individual cards are brought together with their holograms and united. This method does not absolutely exclude the possibility of the holograms being assigned to a wrong card during subsequent insertion in or combination with the card, so that continuous thorough checking is necessary.

Since each hologram is combined with the appropriate card in a conveyor-line operation, a number of holograms being continuously combined with the same number of cards, it is obvious that, if the series of holograms is displaced for example by a single hologram only from the series of cards, all identification elements become useless because each hologram is assigned to the wrong card.

As a further problem of the known process, it is difficult to insert the hologram into the aperture of the card without distorting or displacing it. A perfect insertion of the hologram is required, however, because when the identification element is placed in a reader for reconstruction of the hologram, the reconstructed image otherwise would partially or wholly leave the area of the screen.

The identification elements frequently are composed of several layers, for example of the core of the card which carries the information and two protective films which are laminated to both surfaces of the core to protect it against mechanical abrasion and tampering by unauthorized persons. Lamination is normally performed by heat-sealing the films under pressure and at elevated temperatures, so that thermoplastic materials, e.g. polyvinyl chloride, are preferred as materials for the identification elements and the protective film.

Manufacturers and users of identity documents, e.g. identity cards, check cards, credit cards, customer's cards and the like, are constantly demanding better safety from falsification and unauthorized use, especially of identification elements used for credit transactions. On the other hand, expenditures for safety controls should be low in order to promote a wide use of such identification elements.

SUMMARY OF THE INVENTION

It is the object of the present invention to provide an apparatus and a process for the manufacture of identification elements in which a confusion of holographic information is substantially excluded, thus guaranteeing an absolutely reliable coordination between the hologram and the object from which it was produced, and in which the hologram can be combined with the object without distortion or displacement.

Further, it is the object of the present invention to safeguard the identification elements more reliably against falsification and to render it practically impossible to change the data stored on the identification element.

According to the present invention, this object is achieved in that, prior to holographic exposure, the light-sensitive recording material is firmly and durably combined with the object carrying the information, thus producing the identification element and that the object beam reflected by the object is directed upon the recording material where it forms a hologram of the information to be recorded by interference with the reference beam.

The apparatus for carrying out the inventive process is characterized in that a first reflector which is transparent in the direction of the object is arranged within the path of the object beam of a laser, between a beam splitter and the object carrying the information. Preferably, the first reflector is a semi-transparent mirror which deflects the object beam striking it, after reflection by the object, onto the recording layer of the recording material of the identification element.

According to a further embodiment of the present invention, a second reflector is arranged within the path of the reference beam of the laser, said second reflector directing the reference beam directly on the recording layer of the recording material.

The process according to the present invention has the advantage that the hologram and the object carrying the information which is recorded in holographic form, are correctly assembled without the need for expensive and careful controls, because the hologram is formed on the recording material only after the recording material and the object have been united. By this method of forming a hologram, which may be designated as "self-reproduction", the hologram is invariably and unambiguously assigned to the object to which it belongs.

As a further advantage, the identification elements according to the present invention are much safer from falsification, because in addition to the frontside of the identification element its back is also used for holographic control. This adds to the degree of safety, because in the case of tampering, the personal data on both sides of the identification element would have to be altered with utmost care in order to avoid discovering of the falsification during a holographic control, and it is obvious that two manipulations have a much lesser chance of going undetected during a control than has a single manipulation.

Even if the back of the hologram carries only general data, such as a printed safety pattern, and no personal data of the bearer of the identification element, the safety is considerably increased by a holographic control of both sides, because during delamination of the identification element, in order to get to the core carrying the data, and renewed lamination, the flowing of the thermoplastic material causes local distortions which are easily recognizable during a congruency control.

BRIEF DESCRIPTION OF THE DRAWINGS

In the following, the invention will be illustrated by reference to the embodiments represented by the drawings wherein:

FIG. 9 is a device suitable for controlling either the frontside or the back of an identification element; and FIGS. 10 and 11 show two or more holograms arranged in different ways on an identification element.

DETAILED DESCRIPTION OF THE PREFERRED EMBODIMENT

Figure 1:
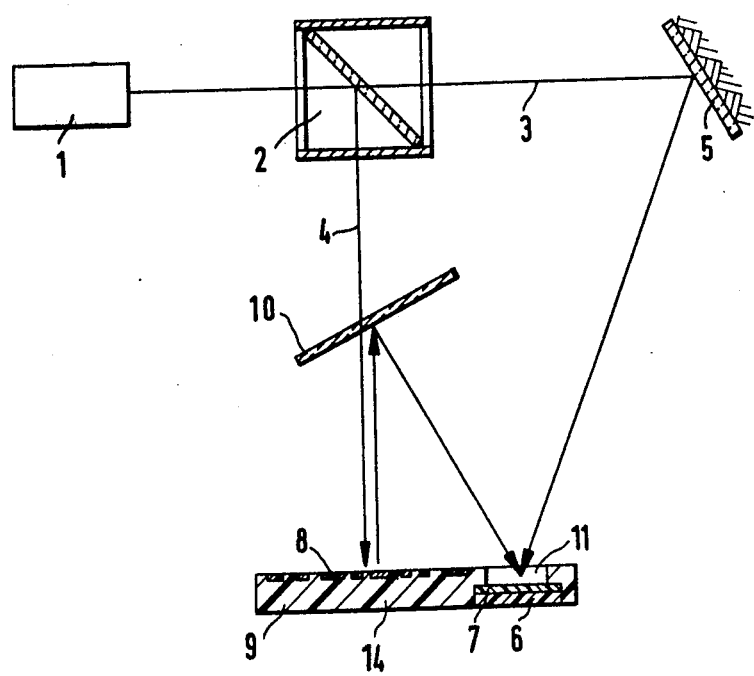
FIG. 1 is a diagrammatic representation of an apparatus for performing the inventive process for the manufacture of identification elements.

FIG. 1 illustrates the formation of a hologram on an identification element 14 composed of an object 9 and a recording material 6. Light emitted by a coherent light source such as a laser 1 is divided by a beam splitter 2 into a reference beam 3 and an object beam 4 (the conventional pinhole with a beam spreader and a photographic shutter being omitted). Via a second reflector 5, for example a mirror, the reference beam 3 directly strikes a light-sensitive recording layer 7 on which is to be reproduced holographically an object 9 and which is already united with a holographic recording material 6. Object 9, e.g. a check card, a credit card, an I.D. card or a customer's card or an identification document, normally carries on its front all essential personal data of the bearer and is positioned, during recording, in a mounting not shown in FIG. 1, which is provided with positioning stops. The object beam 4 is reflected by the object 9 carrying the information 8 and is deflected, by a first reflector 10, onto the recording layer 7. By interference of the two beams 3 and 4, a hologram 15 of the front for example, is produced either alone or together with a hologram 16 of the back of the identification element 14. The hologram or holograms thus produced is or are then developed, without separating the recording material 6 from the object 9. In the particular arrangement shown in FIG. 1, the first reflector 10 is a semi-transparent mirror which is impervious to the incident object beam 4 reflected by the object 9, whereas it permits the object beam 4 reaching it from the beam splitter 2 to pass in the direction of the object 9.

In the following description of FIGS. 1 to 5 reference is made, for the sake of simplification, to the recording of one hologram only, although two or more holograms may be recorded by the same process on one identification element 14, as will be seen from FIGS. 6 to 11.

If a non-transparent mirror is used, the incident object beam must be laterally directed past the mirror. If a hologram is to be laterally reversed, the object beam 4 reflected by the object 9 must be deflected by a further mirror, not shown in the drawings.

By any of various methods the holographic recording material may be united with the object 9 carrying the information 8. FIG. 1 shows an embodiment in which the recording material 6 is inserted in an aperture provided on the back of the object 9.

Figure 2:
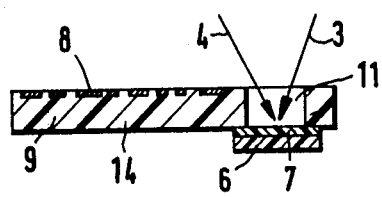
FIG. 2 is an embodiment of the inventive identification element comprising an aperture over which the recording material is stretched.

In the embodiment shown in FIG. 2, the recording material 6 is fastened to the back of the object 9 and is stretched in such a manner over an aperture 11 that the recording layer 7 of the recording material 6 is in direct contact with the back of the object 9.

Figure 3:
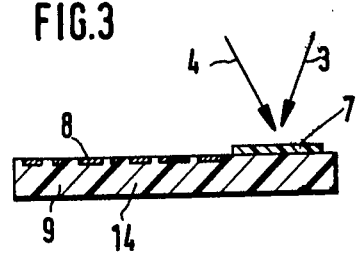
FIG. 3 is a further embodiment of the identification element according to the invention with a recording layer.

In another embodiment, which is shown in FIG. 3, the recording layer 7 is directly applied to the surface of the object 9. This has the advantage that the object 9 simultaneously serves as a base for the recording layer 7, because in this case the recording material consists of the light-sensitive layer 7 alone. If a transparent or clear object 9 is used, the hologram may in this case be reconstructed by irradiation, whereas in the case of a non-transparent object 9 the hologram is reconstructed by reflection.

Figure 4:
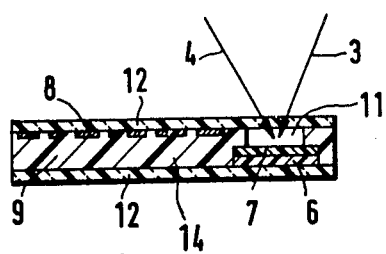
FIG. 4 shows an identification element according to the invention with films laminated to both surfaces.

After development of the hologram in the recording layer 7 both surfaces of the identification element 14 are laminated with protective films 12, as shown in FIG. 4. The embodiment of FIG. 4 is substantially the same as in FIG. 1, except that the protective films 12 are shown. Although it is not apparent from the figures, it goes without saying that the identification elements shown in FIGS. 2 and 3 may also be covered with protective films after development of the hologram formed in the recording layer. In this manner, the hologram is protected against mechanical damage, and in addition, access to the hologram and a possible falsification of the contents of the hologram are prevented.

Figure 5:
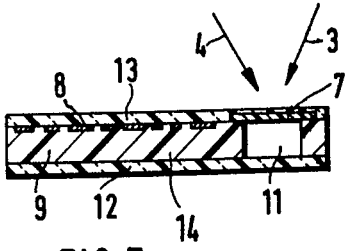
FIG. 5 is an identification element with a film laminated to one surface only.

In the embodiment shown in FIG. 5, the object 9 has an aperture 11 which is covered on the frontside by the recording layer 7. In this embodiment, a laminating film 13 is used as the support for the recording layer 7, for example a laminating film having a recess into which the recording layer 7 is inserted. On the other hand, a recess is not absolutely necessary, since the recording layer is normally only about 5 μm thick and thus may be directly applied to the laminating film 13 without creating an undesirable bulge in the laminating film after combination with the object 9. The back of the object 9 is again covered by a protective film 12.

The selection of the light-sensitive recording layer 7 is very important for the practical performance of the inventive process. In principle any material may be selected, but it is inconvenient if all preparations have to be carried out in the absence of light, as in the case of silver halide films. Therefore, films containing aromatic diazo compounds and suitable coupling components are preferred because they can be processed under yellow safety light. In this case a laser emitting in the near UV range is required for holographic exposure. Such films have the advantage that they are capable of a dry and fast development by means of gaseous ammonia.

Figure 6:
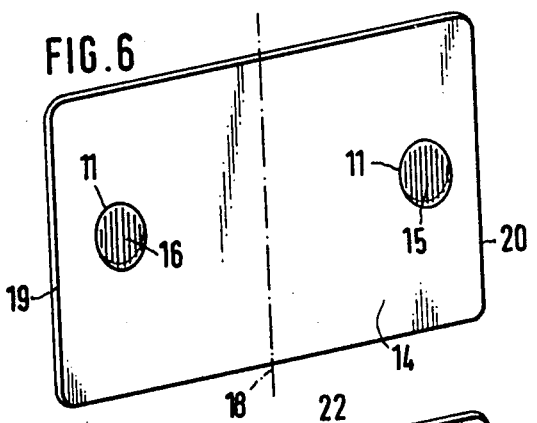
FIGS. 6, 7 and 8 show two or more holograms arranged in different ways on an identification element.

The identification element 14 shown in FIG. 6 contains two separate holograms 15 and 16, capable of through-irradiation, which are arranged at a distance from each other in apertures 11 near the narrow sides 19 and 20 of the identification element 14 and symmetrically to a middle line 18 extending parallel to the narrow sides 19 and 20. As already mentioned, the holograms may also be capable of being read by reflection. Hologram 15 may constitute, for example, a recording of the information on the frontside of the object to be recorded, whereas the hologram 16 contains the information on the back. By inserting the identification element in a reader, either in the position shown in the figure or in a position rotated through 180° about the middle line 18 extending parallel to the narrow sides 19 and 20, either the frontside or the back of the identification element may be compared with the respective hologram.

Figure 7:
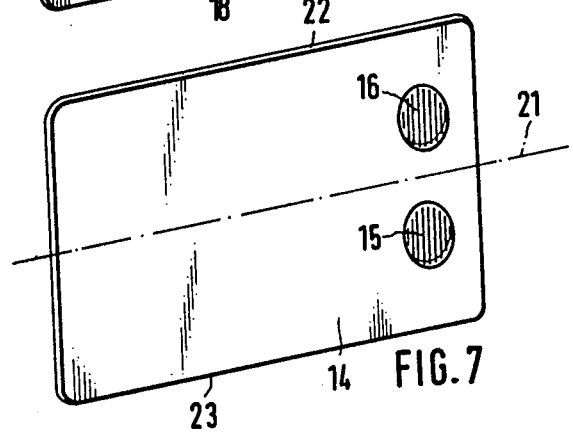
Figure 8:
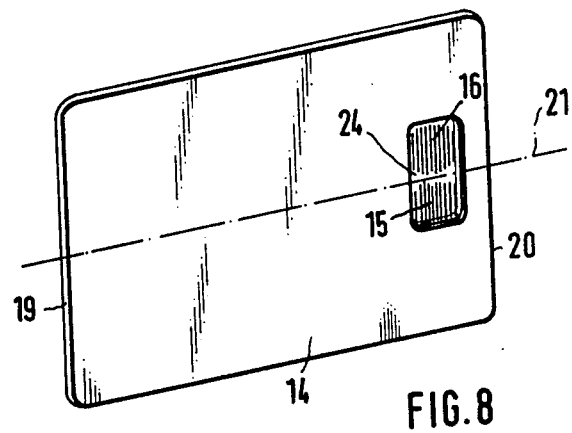

FIG. 7 shows two neighboring holograms 15 and 16 separated by the middle line 21 extending parallel to the long sides 22 and 23. In the embodiment shown in FIG. 8, the holograms 15 and 16 are arranged side by side on a common recording material 24 in the vicinity of and parallel to the narrow side 20. By rotation through 180° about the middle line 21 extending parallel to the long sides 23 and 22 of the identification element 14, the sides to be controlled may be exchanged. The arrangement of the holograms symmetrically to one of the middle lines 18 and 21 is a preferred embodiment of the invention, because in this case the sides to be controlled may be exchanged merely by turning the element through 180°.

FIG. 9 shows a device for exchanging the sides to be controlled. A holder 25 for the identification element 14 carrying the holograms 15 and 16 may be rotated about an axis 26 arranged in the extension of the middle line 21 determining the symmetrical arrangement of the holograms. The two holograms 15 and 16 are reconstructed by means of a single, spread laser beam 27.

If the holder 25 forms part of a reader, it may be rotated either manually, over a mechanical drive, by a tensioned spring, or by means of an electric motor.

The holograms may be recorded in such a manner, for example, that they are superimposed. Separate reconstruction is possible if the recordings were made at different local frequency ranges or different azimuth settings. FIG. 10 shows a diagrammatic representation of an identification element 14 with two superimposed holograms 15 and 16. The different recording conditions used for the frontside hologram and the back hologram are indicated by cross-hatching, in contradistinction from individual holograms which are shaded. It is pointed out in this connection that the present invention does not distinguish between two holograms which are superimposed on the recording material and two holograms which are disposed at a distance from each other on the recording material. The identification element 14 according to FIG. 10 on which the holograms are shown superimposed provides a better safeguard against falsification since very special optical conditions may be selected for the holographic recordings to be superimposed upon each other. One such condition could be that by means of a single laser beam 28, reconstructions of the two holograms may be simultaneously projected, side by side, on a screen 31, with the aid of partial beams 29 and 30. Of course, such double recordings require a considerably higher technical expenditure and a higher degree of precision than are necessary for recording separate holograms.

FIG. 11 shows another embodiment of an identification element 14 with two separate holograms 15 and 16 on a common recording material and with a further hologram 15' which may contain additional data or a section of the object or the card.

By using different azimuth settings or local frequencies — shown in FIG. 11 by differences in the density of the shading of the holograms — it is possible, in like manner as in the case of the embodiment shown in FIG. 10, to reconstruct both holograms simultaneously by means of a single laser beam 32 which is correspondingly spread. Principally, the holograms 15 and 16 may also be recorded on separate recording materials, but in this case either a more expanded laser beam or two separate laser beams must be used.

The embodiments of inventive identification elements containing two or more holograms, as in FIG. 11, may be extended by further holograms, so that not only one or both sides of the identification element or sections thereof may be recorded, but further data may be stored, as desired.

What is claimed is:

1. A process for the manufacture of a holographic identification element comprising the steps of:
    (a) fixedly combining a light-sensitive recording material with an object carrying indicia thereon;
    (b) forming a reference beam and an object beam from a source of coherent light;
    (c) subsequent to step (a) directing said object beam onto said indicia of said object;
    (d) subsequent to step (c) directing the object beam reflected from the indicia of said object onto said light-sensitive recording material; and
    (e) simultaneously with step (d) directing said reference beam onto said light-sensitive recording material thereby producing a hologram of said indicia, whereby a holographic identification element is produced.

2. A process as recited in claim 1 further comprising the step of developing said hologram without separating the recording material from the object.

3. A process as recited in claim 1 wherein the combining step comprises inserting the recording material in an aperture of the object.

4. A process as recited in claim 1 wherein the combining step comprises applying the recording material to the surface of the object.

5. A process as recited in claim 4 wherein the combining step further comprises stretching said recording material over an aperture in the object.

6. A process as recited in claim 1 further comprising the steps of developing the hologram and laminating protective films on both sides of the identification element.

7. A process as recited in claim 1 wherein said combining step comprises applying said recording material to a film and laminating said film to the identification element prior to the formation of the hologram.

8. A process as recited in claim 1 characterized in that a diazo film is used as the recording material.

9. A process as recited in claim 1 comprising the steps of producing a first hologram of indicia on the frontside of said identification element and a second hologram of indicia on the back of said identification element.

10. A process as recited in claim 9 characterized in recording the first and second holograms on different positions of the object.

11. A process as recited in claim 9 characterized in recording said first and second holograms on the same position of the object.

12. A process as recited in claim 9 characterized in recording said first and second holograms separately.

13. A process as recited in claim 9 characterized in recording said first and second holograms by superimposing them at different local frequencies.

14. A process as recited in claim 9 characterized in recording said first and second holograms by superimposing them at different azimuthal settings.

15. A process as recited in claim 9 characterized in recording an additional hologram containing predetermined data or sections of the object.

16. A holograph identification element made in accordance with the process recited in claim 1 comprising:
 (a) a card-like object having indicia thereon; and
 (b) first and second holograms integral with said object, said holograms corresponding to indicia on said object.

17. An identification element as recited in claim 16 characterized in that the holograms correspond to indicia on the frontside and the back of the object and are arranged so that they are symmetrical to a middle line of the object.

18. An identification element as recited in claim 16 characterized in that the holograms are applied side by side to a common recording material which is inserted in an aperture of the object.

* * * * *